Figure 1:
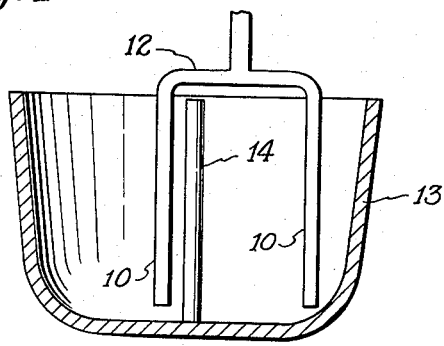

Jan. 20, 1959  C. J. PATTERSON  2,869,484
BAKING PROCESS
Filed Aug. 23, 1957

INVENTOR
Curtis J. Patterson
BY Bailey, Stephens & Huettig
ATTORNEYS

United States Patent Office 2,869,484
Patented Jan. 20, 1959

2,869,484
BAKING PROCESS

Curtis J. Patterson, Kansas City, Mo., assignor to C. J. Patterson Company, a corporation of Missouri Application August 23, 1957, Serial No. 680,377

7 Claims. (Cl. 107—54)

This invention relates to a process for making leavened bread dough. In particular, the invention is directed to a novel process for making dough in a commercial bakery which leads to a simplified makeup operation and an improved product.

This application is a continuation-in-part of my applications filed April 15, 1953, Serial No. 349,100, and Serial No. 407,104, filed January 29, 1954, both for "Baking Process," and both, now abandoned.

There are two conventional processes employed in the commercial production of leavened bread dough, each of which has advantages and peculiarities which make different makeup procedures mandatory. These are the straight dough procedure and the sponge dough procedure.

In the straight dough procedure, all the ingredients are placed in a mixer and mixed thoroughly to obtain development of the flour gluten and to completely hydrate the dry ingredients. Conventionally, the ingredients are stirred together by a rotating reel in a horizontal mixer and finally worked and beaten until the gluten is conditioned. The mixed dough is then transferred to a fermentation trough and fermented, and during the process it raises as gases form, and is knocked back several times. Then conventionally it is divided into loaf size pieces which conventionally are rounded, given overhead proof, moulded, pan proofed, and baked. Because the fermentation is critical in this process and the dough very gassy, the bread produced often has poor volume and a reduced shelf life. For these reasons the use of the straight dough process is, for the most part, restricted to the small retail size bakeries.

The sponge dough process of making dough is quite different. Only about 60% of the ingredients are mixed in the horizontal reel mixer and this mass, known to the art as a sponge, is removed from the mixer, placed in a dough trough, and permitted to ferment. After fermentation, the sponge is returned to the mixer, the rest of the ingredients are added, and the whole mass is worked and beaten until a hydrated and pliable dough is obtained and in condition for the remaining bread-making operations. This mass is known as the dough. It must be given a rest period of about 40 minutes, called floor time, so that the protein molecular structure becomes regrouped and the gluten structure relaxed sufficiently to permit dividing, rounding, overhead proofing, sheeting, and moulding; finally it is pan proofed and baked. In general, the sponge dough process takes longer than the straight dough process but since its conditions are less critical, its use results in a more desirable and uniform product, and it is used in large commercial bakeries for this reason.

In the nineteeth century, it was disclosed, as in Wilcox Patent No. 509,987, that dough can be made by mechanically mixing the ingredients for at least seven minutes, fermenting the mix for about forty-five minutes and then again mixing the dough for at least ten minutes. As the mixer blades were turned by a hand wheel, the mixing speed was necessarily slow. This process also ignored the hydration time and temperature conditions required for the full development of the gluten and the aroma and flavor in order to produce a glutinized dough mass which could then be worked to form a dough having a texture suitable for baking. Consequently, the Wilcox process did not produce good quality bread and was never adopted by the bread industry.

At the beginning of the twentieth century, the Corby patents, Nos. 629,239, 639,889, 640,097, 691,749, disclosed that better conditioning of the dough gluten could be obtained if the mechanical mixing was done at a higher speed than theretofore practiced. Specifically, in Patent No. 629,239, it was stated that by speeding up the mixer, more water could be added to the dough to give better hydration, 38% additional water being specified. The mixing period employed was 20 minutes. The prior mixing speed was said to be about 15 R. P. M. None of the Corby patents state in R. P. M. what the increased speed of the mixer was. However, commercial practice with the usual reel mixers of today operate at a speed of about 65 R. P. M., and so it may be assumed that this is the speed of the Corby process which has been adopted by the baking art. The Corby process did not recognize the significance of the dough hydration and flavor development time during fermentation as having any effect on the mixing time.

Although the Corby patents mentioned a mixing time for dough of 20 minutes, in conventional bakery practice today the mixing time will be anywhere from 8 to 20 minutes. In practice, including the Corby process, the entire time elapsing from the mixing of ingredients to the taking of the loaves from the oven is 6 to 7 hours.

The objectives of the instant invention are to reduce the time and the expense required in the commercial production of bread, and at the same time to improve the eating quality of the product by making it with a finer internal structure and a thinner, more tender crust. Further objects are to produce more uniform doughs, and to eliminate the steps of rounding and overhead proofing from the baking process.

In general, these objectives are obtained by taking a mass comprising the total ingredients, which has been stirred to blend the wet ingredients and dry ingredients, but not mixed specifically to develop gluten, fermenting this mass sufficiently to obtain hydration and the desirable flavors, and then mixing this glutinized dough mass in a large vertical mixer with rotor speeds of 100 to 300 R. P. M. for a period of 2 to 6 minutes. The dough is then divided, and then panned and baked. The conventional operations of rounding and overhead proofing are entirely omitted. The total time elapsing for the production of bread is thereby reduced to 3 to 4 hours.

More specifically, an incorporated and fermented dough mass is placed in a large vertical mixer having a planetary action of the mixing arms, in batches of from about 200 to 1,000 pounds or more. Commercial bakeries usually mix batches of dough weighing at least 400 pounds. The mixer, essentially like a small household cake mixer in design but many times larger in size, was found to be much more efficient and better able to operate at high speeds than the old horizontal reel type machine. Further, this vertical mixer also makes it unnecessary to transfer the ingredient mass to fermentation troughs since the mixing bowls themselves are detachable from the mixer and may be used as such. This results in the advantages of reduced physical handling of the dough, with reduction of labor and improved sanitation.

Figure 2:
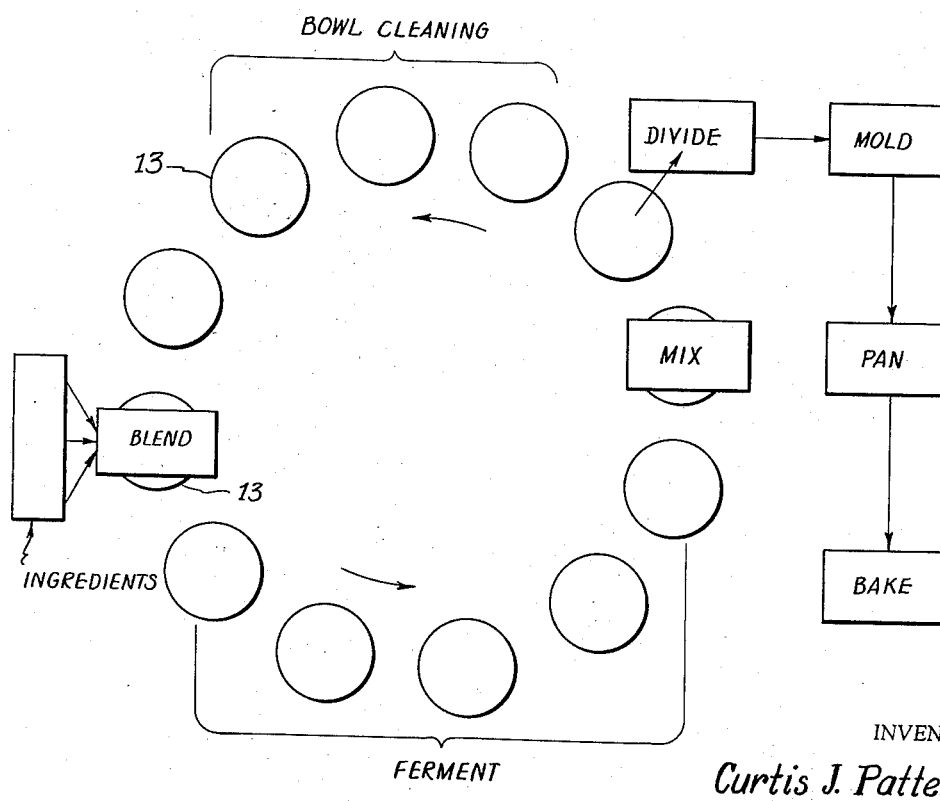

The means by which the objects of the invention are obtained are described more fully with reference to the accompanying drawings, in which:

Figure 1 is a cross-sectional view through a mixing bowl showing the mixing arms in operative position; and Figure 2 is a flow diagram illustrating the steps in the baking process.

The mixer has two or more arms 10 which project down from a cross beam 12 and into the dough mass in the bowl 13, which arms gyrate about a fixed post 14 in the center of the bowl. Fundamentally, this mixer is a giant size version of the small laboratory size mixer disclosed by McDuffee et al. in Patent No. 2,184,225. When operating, the mixer violently stretches, mixes and folds the dough in a very efficient manner when operated with rotor speeds from 100 to 300 R. P. M., the mixer being started at the lower speed and the speed being increased to the higher value during the mixing operation.

With this high speed machine the mixing time is reduced to about 2 to 6 minutes. Not expected, however, was the great efficiency of the process which improved the hydration capacity of the dough so that up to from 3 to 4% more fluid milk or water could be incorporated. The statements in the Corby patents notwithstanding, with the conventional mixing processes, such added liquid results in dough too sticky to put through the conventional machining operation, and too slack to form the elastic, well-conditioned dough required to hold the leavening gases.

As shown in Figure 2, the dough ingredients at room temperature are first placed in an open bowl and blended. Salt may be included or, if desired, temporarily withheld until later as salt inhibits fermentation. This blending can be done in a mixer as shown in Figure 1, and takes from 1 to 2 minutes. No effort is made to develop the gluten, although it is possible that some preliminary development might occur. Thus the blending is discontinued while the mixed ingredients are still in the form of a wet pasty mass. The bowl is then set aside and the dough fermented from 2 to 3 hours. In the meanwhile other batches of dough are being blended and set aside for fermentation.

During this fermentation time, the ingredients in the bowl are at atmospheric pressure, a light cover being loosely placed on the bowl to trap moisture coming from the fermentation to prevent the dough from crusting, and for sanitary reasons. After the ingredients are blended at room temperature, fermentation starts quickly at about from 76° to 79° F. and continues with from about 3° to 4° rise in temperature. During the first hour of fermentation the liquids are absorbed substantially completely so that during a subsequent mixing no extra time is needed for kneading the ingredients in order to hydrate the dough and to substantially fully develop the gluten. In other words, to hydrate the dough mass at the time the solids and liquids are poured together and blended would require a mixing and kneading time of from about seven to fifteen minutes, whereas after an hour of fermentation according to this invention no hydration mixing time is necessary. The remaining one to two hours of fermentation time are necessary for the full development of flavor in the dough.

Following fermentation, the glutinized dough mass is mixed at atmospheric pressure in the mixer of Figure 1, the mixer being operated at a low speed of about 50 to 150 R. P. M. for about fifteen to sixty seconds, and then at a high speed of twice the low speed and in the range of from 100 to 300 R. P. M. for about 2 to 6 minutes, all depending upon the type of dough being mixed, i. e. whether wheat, rye, wholewheat, potato, etc., dough is being mixed.

During this mixing, the dough temperature rises to from 90° to 100° F., principally because of the high speed of the mixer arms. At this time, the gluten in the dough is rapidly stretched, folded and restretched so that it is thinned and worked into a dough texture which eventually results in the uniform grain structure of the finally baked product. If salt was omitted during the original blending of the ingredients, it is added during this mixing.

The dough is then taken from the bowl and within 10 or 15 minutes placed in a divider. From the divider, the lumps of dough pass directly into a moulder and then into pans, this operation taking from ten to fifteen minutes, more or less, depending on the weight of the dough batch which has been mixed. The pans are then placed in the oven to bake the bread. It is noted that following dividing the conventional steps of rounding and overhead proofing are omitted.

Figure 2 further shows the mixing bowls being cleaned after leaving the divider, and then recycled to the blender.

Because of the improved dough, a superior bread is obtained having a finer grain and a thinner crust. The crumb structure itself as well as flavor and aroma are those traditionally expected in well-baked bread, but noticeably better.

This process reduces bread making time from 6 to 7 hours to 3 to 4½ hours and results in increased bakery capacity and a material reduction in labor. Further, the vertical high speed mixer uses less floor space than the conventional reel mixer with its refrigeration requirements, and its use makes possible the elimination of the dough room, the rounder, and the overhead proofer. This results in a considerable saving of floor space.

Examples of this process are as follows:

*Example I*

An incorporated mass of ingredients was prepared by placing the following ingredients at room temperature into the bowl of the large vertical mixer. It should be understood that any device which will cause a blending of the wet and dry ingredients will suffice for this operation.

| | Pounds |
|---|---|
| Flour | 280 |
| Water | [1] 187.6 |
| Sugar | 22.4 |
| Yeast | 8.4 |
| Dry milk | 8.4 |
| Lard | 5.6 |
| Salt | 5.6 |
| Yeast food | 2.1 |

[1] 8.5% above usual amount.

This mass was fermented at atmospheric pressure in the detachable bowl for two hours to develop the full fermented flavor necessary in bread, and the bowl with the fully fermented glutinized dough mass was then returned to the mixer. This bowl had a center pin about which the mixing arms of the mixer rotor moved in an intricate planetary motion essentially like that of a small household cake mixer. Mixing at atmospheric pressure was started at 100 R. P. M. for 1 minute and then was raised to 200 R. P. M.; total mixing time was 4 minutes. The dough was of excellent consistency and well aerated as evidenced by enormous bubbles breaking on its surface.

The dough was sent directly to a divider and broken into sizes sufficient to produce one pound loaves. These were moulded, panned, proofed 50 minutes, and baked 20 minutes at 475° F.

The finished loaves were examined and found to have a superior internal grain, a thinner, more tender crust, and a finer, more desirable flavor than loaves prepared by conventional procedures.

*Example II*

The same ingredients as in Example I, with the exception of the salt, were blended at room temperature in the bowl for 1 minute. This mass was fermented at atmospheric pressure at a self-induced temperature of about 83° F. for 2½ hours. The glutinized dough mass in the bowl was then returned to the vertical mixer, the 5.6 pounds of salt added, and mixed at atmospheric pressure for fifteen seconds with a mixer arm speed of 100 R. P. M., and then at 200 R. P. M. for 3.5 minutes, the dough temperature rising to about 95° F. Within 15 minutes following mixing, the dough was divided, moulded, panned, proofed 50 minutes, and baked 20 minutes at 475° F. As in Example I, the finished loaves were of excellent quality.

Having now described the means by which the objectives of this invention are obtained,

I claim:

1. A leavened dough preparing process comprising stirring and blending together dough ingredients composed of solids and liquids, discontinuing the blending while the ingredients are in a wet pasty form, immediately setting aside the blended ingredients for a time and under only self-induced temperature conditions sufficient for the substantially full development of the gluten and flavor to form a glutinized dough mass, and then mixing the glutinized dough mass by mechanical stirring to work it into a dough texture ready for dividing into baking units.

2. A leavened dough preparing process as in claim 1, said ingredients being blended for not more than about two minutes, the blended ingredients being set aside and fermented from about two to three hours, and then the glutinized dough mass being rapidly stirred for about from two to four minutes.

3. A leavened dough baking process comprising blending dough ingredients composed of liquids and solids, discontinuing the blending while the blended ingredients are in a wet pasty form, immediately setting aside and fermenting the blended ingredients for a time and under only self-induced temperature conditions sufficient for the substantially full development of the gluten and flavor to form a glutinized dough mass, rapidly mixing the dough mass by mechanical stirring to work it into a dough structure ready for dividing, then in direct sequence dividing, moulding, and panning said dough, and then baking the dough.

4. A bakery system for preparing leavened dough comprising means for blending dough ingredients composed of liquids and solids into a wet pasty form, means for setting aside and fermenting the blended ingredients for a time and under temperature conditions sufficient for the substantially full development of the gluten and flavor to form a glutinized dough mass, mixer means for mixing the dough mass by mechanically stirring it with mixer arms rotatable at about from 50 to 300 R. P. M., and means for dividing the dough into bakable units.

5. A leavened dough preparing process as in claim 1, comprising developing the gluten and flavor and mixing the glutinized dough mass all at atmospheric pressure.

6. A leavened dough preparing process as in claim 5, further comprising withholding salt from the blending of the dough ingredients, and adding salt during the mixing of the glutinized dough mass.

7. A leavened dough preparing process as in claim 6, comprising developing the gluten and flavor at a fermentation temperature of from about 76° to 79° F., and mixing the glutinized dough mass to a temperature of from about 90° to 100° F.

References Cited in the file of this patent

UNITED STATES PATENTS

| | | |
|---|---|---|
| 1,258,793 | Lovelace et al. | Mar. 12, 1918 |
| 1,312,094 | Baker et al. | Aug. 5, 1919 |
| 1,369,724 | Benz | Feb. 22, 1921 |
| 1,733,945 | De Huff | Oct. 29, 1929 |
| 1,801,101 | Morton et al. | Apr. 14, 1931 |
| 1,840,578 | Garvey | Jan. 12, 1932 |
| 1,898,175 | Garvey | Feb. 21, 1933 |
| 2,181,079 | De Huff | Nov. 21, 1939 |
| 2,184,225 | McDuffee et al. | Dec. 19, 1939 |
| 2,404,380 | Jensen | July 23, 1946 |
| 2,547,566 | Cohoe | Apr. 3, 1951 |
| 2,728,308 | Nelson | Dec. 27, 1955 |

FOREIGN PATENTS

| | | |
|---|---|---|
| 735,184 | Great Britain | Aug. 17, 1955 |

OTHER REFERENCES

Glen "340" Mixer (Circular), Glen "120" Mixer (Circular), Glen "160" Mixer (Circular), Am. Mach. & Foundry Company.

Hobart Model C-10 Mixer, Hobart Manufacturing Company.

Hobart Model V-1400 Mixer, Hobart Manufacturing Company.